United States Patent
Fujimoto (10) Patent No.: US 9,338,764 B2
(45) Date of Patent: May 10, 2016

(54) RADIO COMMUNICATION SYSTEM, MOBILE STATION AND RADIO COMMUNICATION METHOD

(75) Inventor: Shinobu Fujimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 503 days.

(21) Appl. No.: 13/810,148

(22) PCT Filed: Jul. 13, 2011

(86) PCT No.: PCT/JP2011/004010
§ 371 (c)(1),
(2), (4) Date: Jan. 14, 2013

(87) PCT Pub. No.: WO2012/008153
PCT Pub. Date: Jan. 19, 2012

(65) Prior Publication Data
US 2013/0114559 A1    May 9, 2013

(30) Foreign Application Priority Data
Jul. 15, 2010  (JP) .................. 2010-160846

(51) Int. Cl.
*H04W 72/04* (2009.01)
*H04L 27/26* (2006.01)
*H04L 5/00* (2006.01)

(52) U.S. Cl.
CPC ............ *H04W 72/04* (2013.01); *H04L 5/0048* (2013.01); *H04L 5/0092* (2013.01); *H04L 27/2611* (2013.01)

(58) Field of Classification Search
None
See application file for complete search history.

(56) References Cited

U.S. PATENT DOCUMENTS

| 2010/0080187 A1 | 4/2010 | Papasakellariou et al. |
| 2010/0322227 A1* | 12/2010 | Luo .............................. 370/345 |
| 2011/0019636 A1 | 1/2011 | Fukuoka et al. |
| 2014/0016602 A1 | 1/2014 | Papasakellariou et al. |

FOREIGN PATENT DOCUMENTS

| JP | 2008-219625 A | 9/2008 |
| JP | 2008-236592 A | 10/2008 |
| WO | 2009/119067 A1 | 10/2009 |
| WO | 2010/036053 A2 | 4/2010 |

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8).

(Continued)

*Primary Examiner* — Jackie Zuniga Abad
(74) *Attorney, Agent, or Firm* — Studebaker & Brackett PC (57) ABSTRACT

A mobile station transmits an appropriate reference signal to substantialize appropriate AAS control. A mobile station 100 according to the present invention includes a transmission and reception unit 110 configured to perform a radio communication with a base station 1 and a control unit 130 configured to, by using a reference signal region of an uplink communication channel in the same frequency band as a downlink communication channel assigned to the mobile station itself in assignment information of a communication channel from the base station 1 received by the transmission and reception unit 110, transmit a reference signal from the transmission and reception unit to the base station.

4 Claims, 6 Drawing Sheets

(56) References Cited

OTHER PUBLICATIONS

International Search Report; PCT/JP2011/004010; Aug. 16, 2011.
An Office Action; "Notice of Reasons for Refusal," issued by the Japanese Patent Office on Sep. 24, 2014, which corresponds to Japanese Patent Application No. 2013-243779 and is related to U.S. Appl. No. 13/810,148 with English language concise explanation.
Samsung; "Antenna calibrations for TDD CoMP", 3GPP TSG RAN WG1 #60; R1-101177; Feb. 22-26, 2010; San Francisco, USA.
Japanese Office Action "Notification of Reasons for Refusal" dated May 7, 2013, which corresponds to Japanese Patent Application No. 2012-524451 and is related to U.S. Appl. No. 13/810,148 with translation.

* cited by examiner

FIG. 1

RADIO COMMUNICATION SYSTEM, MOBILE STATION AND RADIO COMMUNICATION METHOD

CROSS REFERENCE TO RELATED APPLICATION

This application claims priority to and the benefit of Japanese Patent Application No. 2010-160846 (filed on Jul. 15, 2010), the entire contents of which are incorporated herein by reference.

TECHNICAL FIELD

The embodiment discussed herein relates to a radio communication system, a mobile station and a radio communication method.

BACKGROUND

A standards body of mobile communication methods, 3GPP, has recently been deliberating about LTE (Long Term Evolution). Especially for the LTE employing TDD (Time Division Duplex), introduction of AAS (Adaptive Antenna System) has been considered. The AAS changes radio wave directionality by performing adaptive control of weighting on each of a plurality of antenna elements forming an array antenna in accordance with a transmission environment. An adaptive array base station that deals with the AAS, by using, in downlink transmission, an antenna weight calculated based on a reference signal (Reference Signal) transmitted from a mobile station, performs adaptive control such as beam forming, null steering and the like to a desired mobile station.

Figure 5:
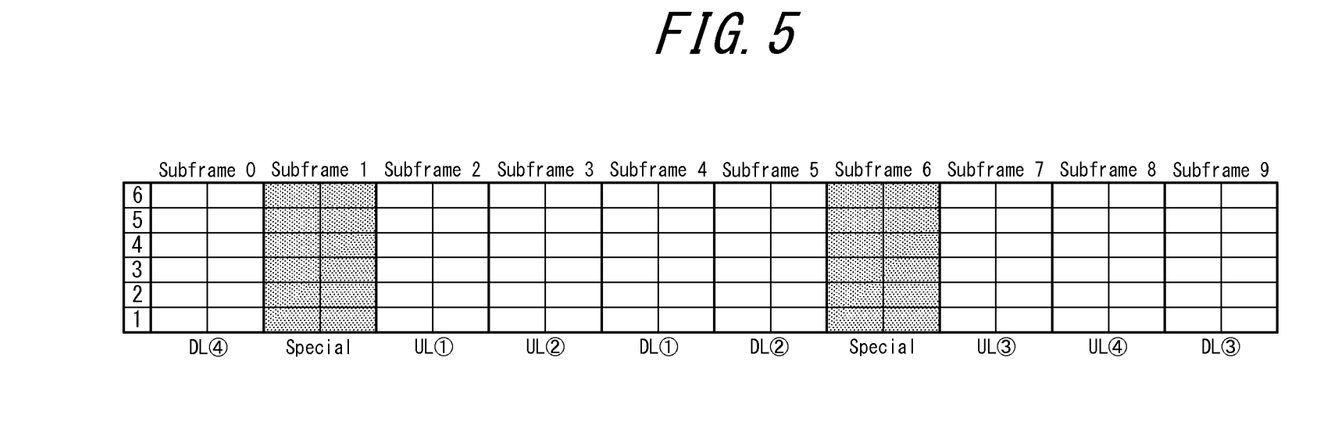
FIG. 5 is a diagram illustrating an exemplary configuration of a communication frame of LTE.

As illustrated in FIG. 5, a communication frame of the LTE employing the TDD comprises 10 subframes. Each of the subframes is categorized into a UL subframe for an uplink communication from the mobile station to the base station, a DL subframe for a downlink communication from the base station to the mobile station, and a Special subframe having both a UL area for the uplink communication and a DL area for the downlink communication in the subframe (for example, see Non-Patent Document 1).

The AAS defines a pair of (correspondence relationship between) the UL subframe and the DL subframe, and the pair for the communication between the base station and the mobile station is preferably used. This is because, when the base station receives the reference signal in the UL subframe transmitted from the mobile station, the base station may calculate an appropriate transmission weight based on the reference signal and perform the downlink communication with the DL subframe more efficiently.

Figure 6:
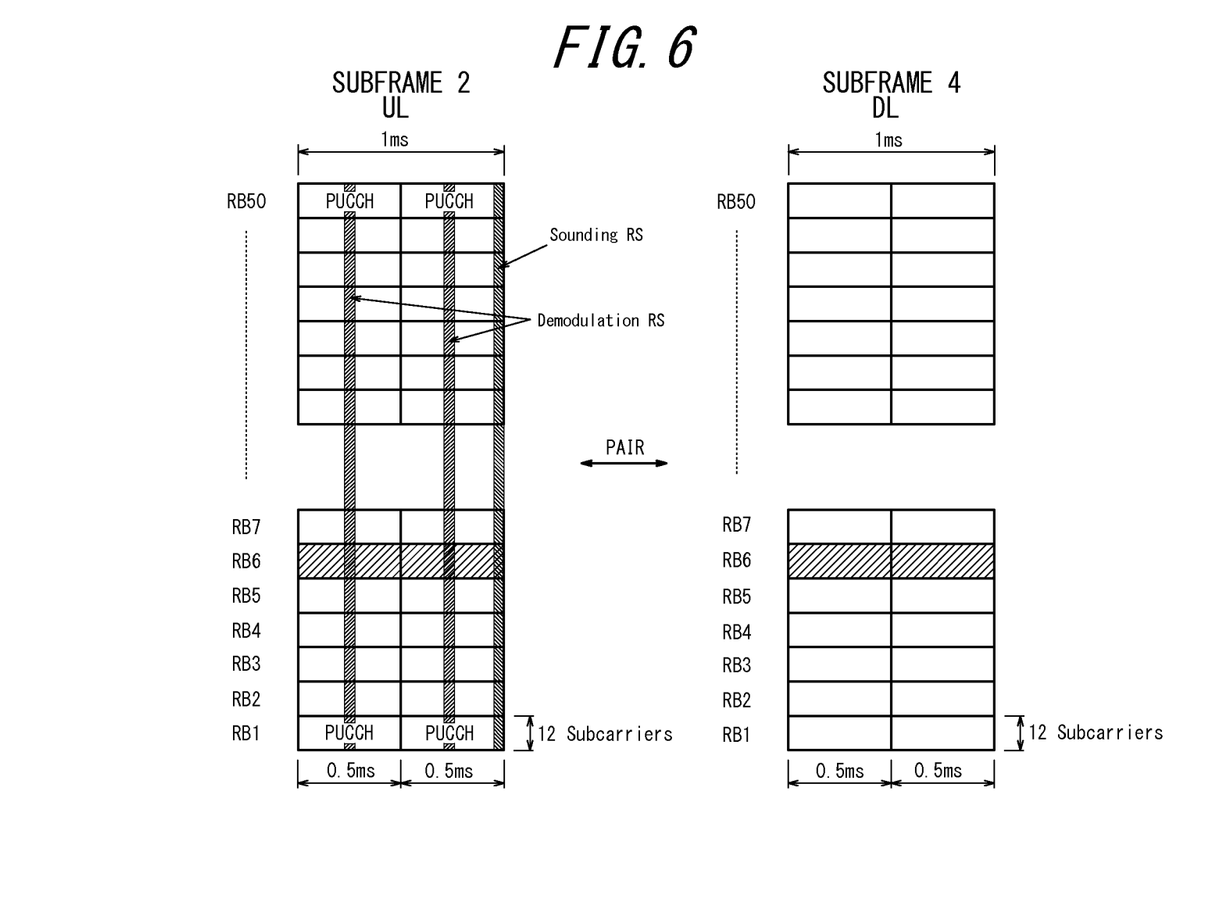
FIG. 6 is a diagram illustrating a pair of subframes in detail.

FIG. 6 is a diagram illustrating a pair of the UL subframe and the DL subframe in detail. A subframe 2 serving as the UL subframe and a subframe 4 serving as the DL subframe are paired with each other and a resource block (radio communication channel) RB6 of each of them is assigned to a common mobile station. The subframe 2 serving as the UL subframe includes DRS (Demodulation Reference Signal) and SRS (Sounding Reference Signal) as symbols for transmitting the reference signal (a reference signal region). The DRS is a reference signal transmitted in association with user data from the mobile station to the base station, and the SRS is a reference signal that may be transmitted without being associated with the user data. In a case of FIG. 6, since the subframe 2 serving as the UL subframe is assigned to the mobile station for transmitting the user data to the base station, the mobile station may transmit the reference signal to the base station by using the DRS of the resource block RB6 of the subframe 2. When receiving the reference signal, the base station may appropriately perform adaptive array control for the resource block RB6 of the subframe 4.

RELATED ART DOCUMENT

Non-Patent Document

Non-Patent Document 1: 3GPP TS36.211(V8.7.0), "Physical Channels and Modulation", May 2009

SUMMARY

In using conventional LTE, only when resource blocks in the same frequency band in a pair of the UL subframe and the DL subframe are assigned to a common base station, the mobile station may transmit the reference signal for an adaptive array to the base station. In a general packet communication, however, more data are transmitted in the downlink communication than in the uplink communication. Therefore, when the resource blocks corresponding to a data amount in the downlink communication are symmetrically assigned to the paired UL subframe and the DL subframe, an unnecessary resource block including no transmission data is generated in the UL subframe. On the other hand, when the resource blocks are unsymmetrically assigned to the UL subframe and the DL subframe for the mobile station and the UL subframe and the DL subframe are not paired with each other, the mobile station is unable to transmit the reference signal for the adaptive array to the base station.

Accordingly, in consideration of such a condition, the present invention provides a radio communication system in which a mobile station, to which the UL subframe is not assigned correspondingly to the DL subframe, may substantialize appropriate AAS control by transmitting an appropriate reference signal, a mobile station and a radio communication method.

In order to achieve the above matters, a radio communication system according to a first aspect of the present invention includes a base station having a plurality of antennas and a mobile station for performing a radio communication by connecting to the base station, wherein the base station includes:

a first transmission and reception unit configured to perform the radio communication with the mobile station;

a first control unit configured to assign a communication channel used for the radio communication with the mobile station and to transmit assignment information of the communication channel from the first transmission and reception unit to the mobile station; and a calculation unit configured to, based on a reference signal from the mobile station received by the first transmission and reception unit, calculate a weight used for transmitting a radio signal to the mobile station, and the mobile station includes:

a second transmission and reception unit configured to perform the radio communication with the base station; and a second control unit configured to, by using a reference signal region of an uplink communication channel in the same frequency band as a downlink communication channel assigned to the mobile station in the assignment information from the base station received by the second transmission and reception unit, transmit to the base station the reference signal from the second transmission and reception unit.

Also, in order to solve the above problems, a mobile station according to a second aspect of the present invention for performing a radio communication by connecting to a base station having a plurality of antennas includes:

a transmission and reception unit configured to perform the radio communication with the base station; and a control unit configured to, by using a reference signal region of an uplink communication channel in the same frequency band as a downlink communication channel assigned to the mobile station in assignment information of a communication channel from the base station received by the transmission and reception unit, transmit to the base station a reference signal from the transmission and reception unit.

Although apparatuses are used as solutions according to the present invention as described above, it should be understood that the present invention may also be substantialized by methods, programs and storage media storing the programs that are substantially equivalent to the apparatuses and hence they are included in a scope of the present invention.

For example, as a method substantializing the present invention, a radio communication method for a radio communication system including a base station having a plurality of antennas and a mobile station for performing a radio communication by connecting to the base station according to a third aspect of the present invention, includes steps for:

the base station assigning a communication channel used for the radio communication with the mobile station and transmitting assignment information of the communication channel to the mobile station;

the mobile station, by using a reference signal region of an uplink communication channel in the same frequency band as a downlink communication channel assigned to the mobile station in the assignment information from the base station, transmitting a reference signal to the base station; and the base station, based on the reference signal from the mobile station, calculating a weight used for transmitting a radio signal to the mobile station.

According to an embodiment of the present invention, the mobile station, to which a UL subframe is not assigned correspondingly to a DL subframe, may substantialize appropriate AAS control by transmitting an appropriate reference signal.

DESCRIPTION OF EMBODIMENT

An embodiment of the present invention will be described with reference to the accompanying drawings.

Figure 1:
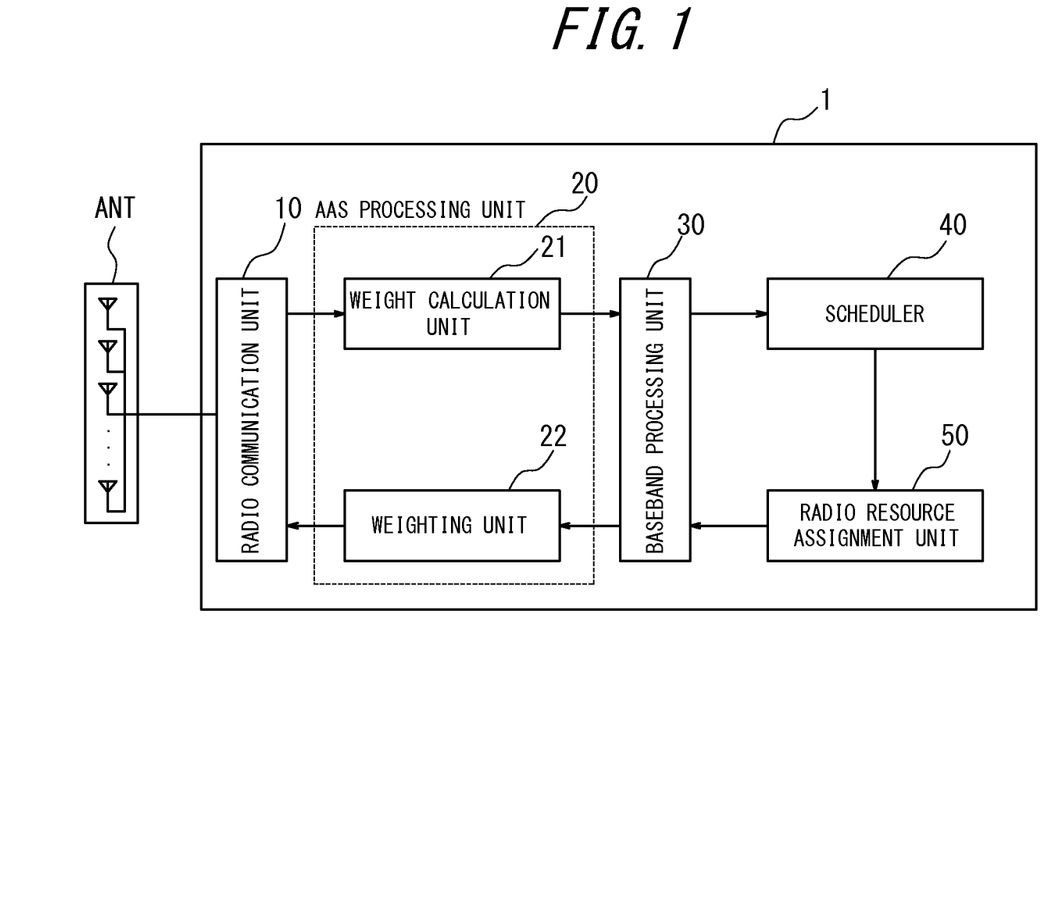
FIG. 1 is a functional block diagram illustrating a base station according to one embodiment of the present invention.
Figure 2:
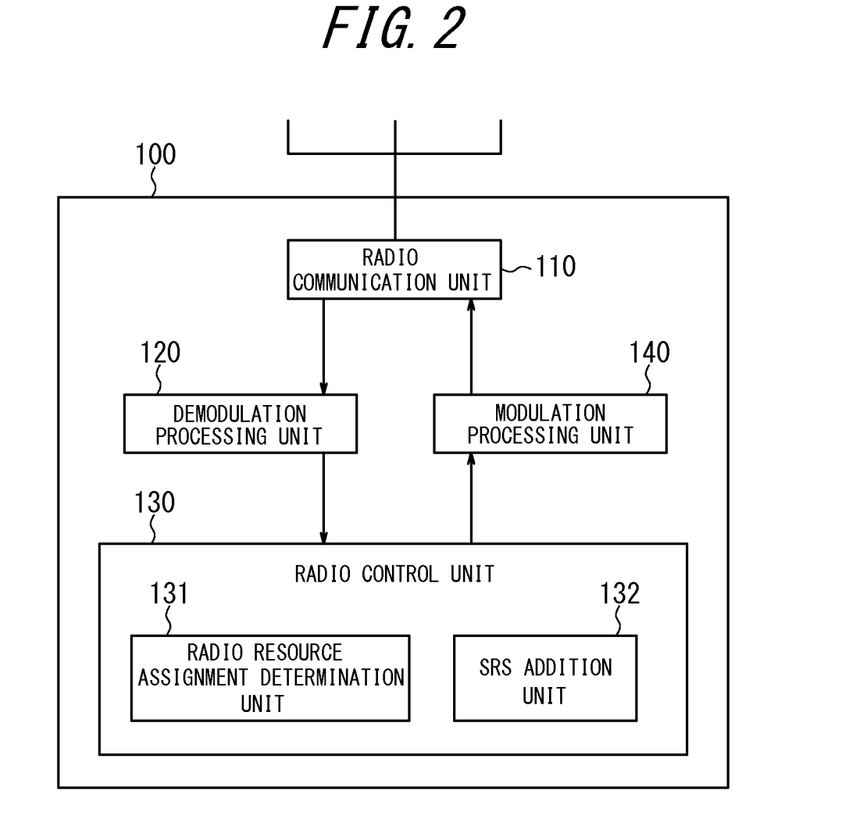
FIG. 2 is a functional block diagram illustrating a mobile station according to one embodiment of the present invention.

A radio communication system according to one embodiment of the present invention includes a base station 1 and a mobile station 100. FIG. 1 is a functional block diagram of the base station 1 according to one embodiment of the present invention, and FIG. 2 is a functional block diagram of the mobile station 100 according to one embodiment of the present invention.

The base station 1 illustrated in FIG. 1 is an adaptive array base station employing LTE of TDD (Time Division Duplex) and having a plurality of antennas. The base station 1 includes an array antenna ANT, a radio communication unit 10 (first transmission and reception unit), an AAS processing unit 20 including a weight calculation unit (calculation unit) 21 and a weighting unit 22, a baseband processing unit 30, a scheduler 40 and a radio resource assignment unit 50. The radio communication unit 10, the AAS processing unit 20 and the baseband processing unit 30 are constituted by using an interface equipment/circuit suitable for the LTE. The scheduler 40 and the radio resource assignment unit 50 are constituted by using a suitable processor such as CPU or the like and correspond to a first control unit stated in CLAIMS. The following is a detailed description of each of the units.

The radio communication unit 10, as reception system processing, converts a radio signal at a carrier frequency received by the array antenna ANT into a radio signal at a baseband frequency and outputs the converted signal to the weight calculation unit 21. Also, the radio communication unit 10, as transmission system processing, converts a signal at the baseband frequency from the weighting unit 22 into a signal at the carrier frequency and transmits the signal to the mobile station 100 via the array antenna ANT by performing adaptive array control.

The weight calculation unit 21 in a reception system of the AAS processing unit 20 performs adaptive signal processing to the signal input from the radio communication unit 10 and outputs the signal to the baseband unit 30. In detail, as the adaptive signal processing, the weight calculation unit 21, by using a reference signal (Reference Signal) transmitted in a UL subframe from the mobile station 100 and other known information, calculates a transmission weight (weighting of phase/amplitude of each antenna element) for a DL subframe paired with the UL subframe, based on phase information obtained for each antenna element of the array antenna ANT, such that high transmission gain to the mobile station 100 may be obtained. On the other hand, the weighting unit 22 in a transmission system adds the transmission weight obtained by the weight calculation unit 21 to the signal input from the baseband unit 30 and outputs the signal to the radio communication unit 10.

The baseband processing unit 30, as the reception system processing, demodulates the signal input from the weight calculation unit 21 and outputs a result of the demodulation to the scheduler 40 separately for each mobile station. Also, the baseband processing unit 30, as the transmission system processing, outputs transmission data to be transmitted to the mobile station 100 input from the radio resource assignment unit 50 and a symbol array of a resource block map (RB-MAP) indicating assignment of a radio resource (communication channel) to the weighting unit 22.

The scheduler 40, based on the data of each mobile station input from the baseband processing unit 30, determines a mobile station to assign a resource block (radio communication channel). In detail, the scheduler 40, based on quality of a received signal of each resource block informed from each mobile station, channel quality information (CQI) or an amount of data to be transmitted, determines the mobile station to assign the resource block.

The radio resource assignment unit 50 assigns the radio resource to the mobile station determined by the scheduler 40. The radio resource assignment unit 50, after assigning the radio resource, generates the resource block map (RB-MAP) for informing the mobile station 100 of an assignment result.

The resource block map (RB-MAP) is transmitted from the radio communication unit 10 to the mobile station 100 via the baseband processing unit 30 and the weighting unit 22.

The mobile station 100 illustrated in FIG. 2 includes a radio communication unit (second transmission and reception unit (transmission and reception unit)) 110, a demodulation processing unit 120, a radio control unit (second control unit (control unit)) 130 and a modulation processing unit 140. The radio control unit 130 includes a radio resource assignment determination unit 131 and a SRS addition unit 132. The radio communication unit 110, the demodulation processing unit 120 and the modulation processing unit 140 are constituted by using an interface equipment/circuit suitable for the LTE. The radio control unit 130 is constituted by using a suitable processor such as the CPU or the like. The following is a detailed description of each of the units.

The radio communication unit 110, which is configured to perform the radio communication with the base station 1, supplies data received from the base station 1 to the demodulation processing unit 120 and transmit data supplied from the modulation processing unit 140 to the base station 1.

The demodulation processing unit 120 demodulates the data received from the base station 1 and supplies the demodulated data to the radio control unit 130. The modulation processing 140 modulates the data supplied from the radio control unit to be transmitted to the base station and supplies the modulated data to the radio communication unit 110.

The radio resource assignment determination unit 131 of the radio control unit 130, when receiving the resource block map (RB-MAP) indicating assignment of the radio resource from the base station 1, determines the assignment of the radio resource to the mobile station itself. In detail, the radio resource assignment determination unit 131, when the DL subframe is assigned to the mobile station itself, determines whether a resource block in the same frequency band in a UL subframe paired with the DL subframe is assigned to the mobile station itself. When the resource block in the same frequency band in the UL subframe paired with the assigned DL subframe is not assigned, the mobile station 100 is unable to transmit a reference signal necessary for the AAS control to the base station 1. Therefore, the radio resource assignment determination unit 131 sends an SRS adding instruction to the SRS addition unit 132.

Figure 4:
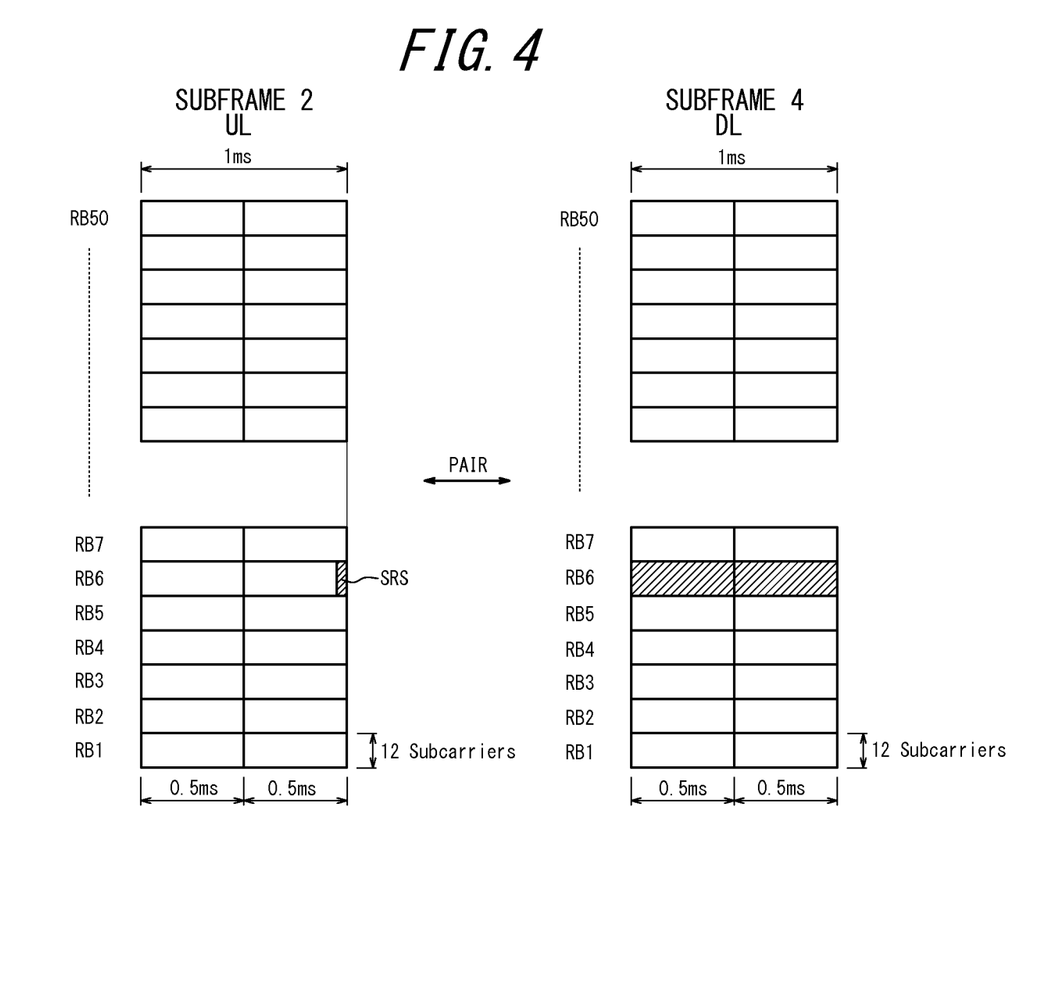
FIG. 4 is a diagram illustrating an example of transmission of a reference signal according to one embodiment of the present invention.

The SRS addition unit 132, when receiving the SRS adding instruction from the radio resource assignment determination unit 131, transmits the reference signal to the base station by using SRS (the reference signal region) in the UL subframe paired with the DL subframe assigned to the mobile station itself. FIG. 4 is a diagram illustrating an example of addition of the SRS. In FIG. 4, a subframe 2 as the UL subframe and a subframe 4 as the DL subframe are paired with each other. A resource block RB6 in the subframe 4 as the DL subframe is assigned to the mobile station 100, while a resource block RB6 in the subframe 2 as the UL subframe is not assigned to the mobile station 100. In this case, the SRS addition unit 132, by using the SRS (the reference signal region) of the resource block RB6 in the subframe 2 paired with the subframe 4, transmits the reference signal to the base station 1. In transmission using the SRS, the resource block 6 alone needs to be included. For example, several resource blocks around the resource block RB6 in a frequency direction may be used for transmission. When receiving the reference signal, the base station 1 may perform optimum adaptive array control for the resource block RB6 in the subframe 4.

Figure 3:
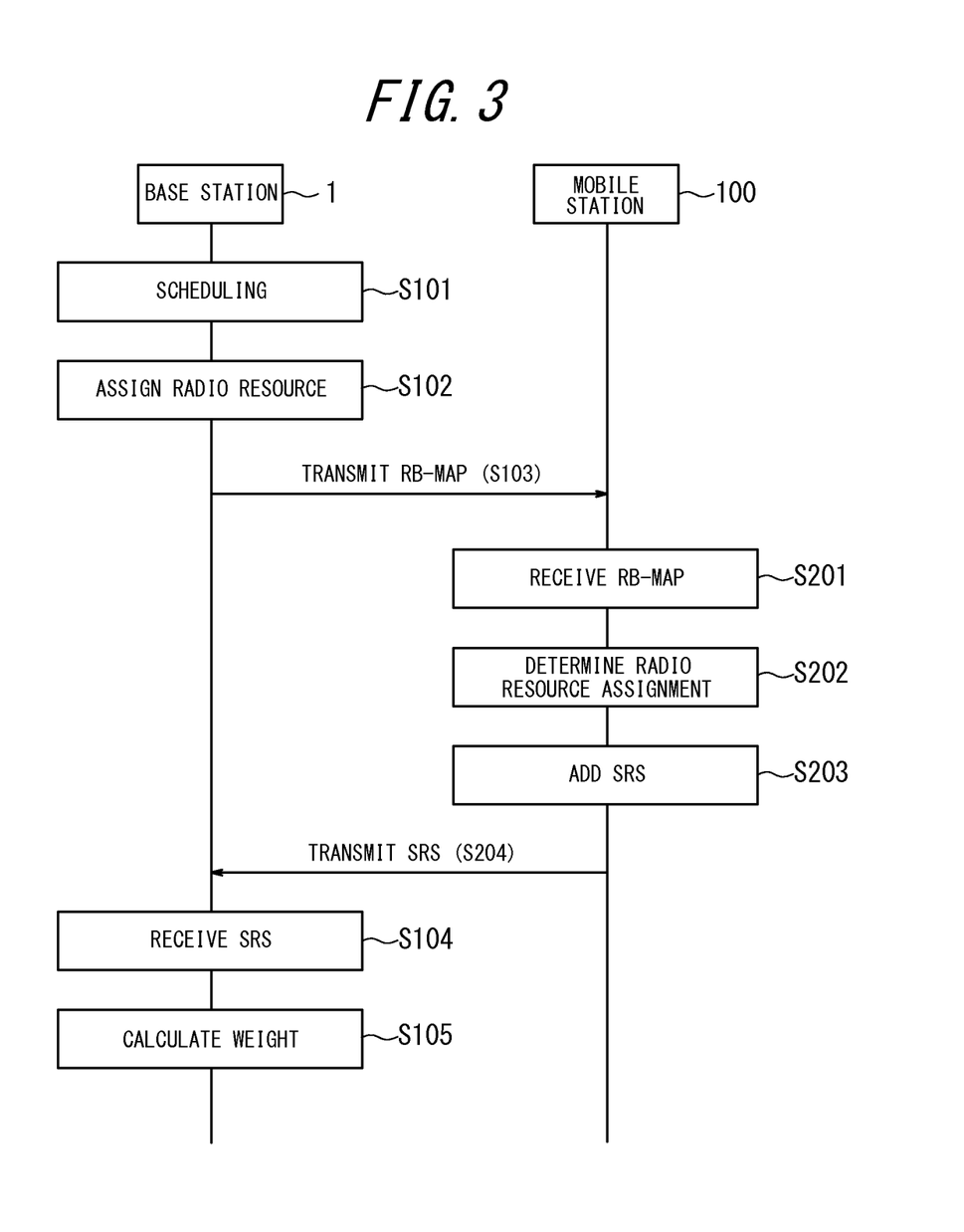
FIG. 3 is a flowchart of operations of the base station and the mobile station.

FIG. 3 is a flowchart of operations of the base station 1 and the mobile station 100. The scheduler 40 of the base station 1 performs scheduling such as setting a mobile station to assign the resource block based on the data received from each mobile station (step S101). The radio resource assignment unit 50 assigns the radio resource to the mobile station set by the scheduler 40 (step S102). The radio resource assignment unit 50, after assigning the radio resource, generates the resource block map (RB-MAP) for informing the mobile station 100 of the assignment result and transmits the resource block map to the mobile station 100 (step S103).

When the mobile station 100 receives the resource block map (RB-MAP) indicating assignment of the radio resource from the base station 1 (step S201), the radio resource assignment determination unit 131 determines assignment of the radio resource to the mobile station itself (step S202). When the resource block in the same frequency band in the UL subframe paired with the DL subframe is not assigned to the mobile station itself, the radio resource assignment determination unit 131 sends the SRS adding instruction to the SRS addition unit 132. The SRS addition unit 132, upon receiving the SRS adding instruction from the radio resource assignment determination unit 131, transmits the reference signal to the base station 1 by using the SRS of the resource block in the same frequency band in the UL subframe paired with the DL subframe assigned to the mobile station itself (steps S203, S204).

When the base station 1 receives the SRS in the UL subframe from the mobile station 100 (step S104), the weight calculation unit 21 may calculate an optimum transmission weight for the DL subframe paired with this UL subframe (step S105).

According to the present embodiment, when a pair of the UL subframe and the DL subframe is not assigned to the mobile station 100, the radio control unit 130 transmits the reference signal to the base station 1 by using the reference signal region of the SRS and the like in the UL subframe paired with the DL subframe assigned to the mobile station itself. Thereby, the base station 1 may receive an appropriate reference signal from the mobile station 100 and may perform appropriate AAS control in a downlink communication. Especially, since the SRS is the reference signal that may be transmitted without being associated with user data, the reference signal for AAS may be transmitted without wasting a physical channel of an uplink. Also, there is no need to define a new message and the like between the base station 1 and the mobile station 100. When the UL subframe for uplink is assigned to the mobile station 100, the mobile station 100 may transmit the reference signal by using DRS (another reference signal range) of the assigned UL subframe, instead of the SRS. When the UL subframe for uplink separated from the DL subframe paired therewith is assigned to the mobile station 100, the mobile station 100 may transmit the reference signal by using the SRS of the UL subframe close to the DL subframe, other than the DRS in the assigned UL subframe. Thereby, the transmission weight of the DL subframe may be appropriately calculated.

Although the present invention is described based on figures and the embodiment, it is to be understood that those who are skilled in the art may easily vary or alter in a multiple manner based on disclosure of the present invention. Accordingly, such variation and modification are included in a scope of the present invention. For example, the baseband processing unit 30 may have a function of the AAS processing unit 20 to calculate and add the weight in AAS according to the above embodiment. Also, a function or the like of each component or each step may be rearranged avoiding a logical inconsistency, such that a plurality of components or steps are combined or divided.

REFERENCE SIGNS LIST 1 base station
10 radio communication unit
20 AAS processing unit
21 weight calculation unit
22 weighting unit
30 baseband processing unit
40 scheduler
50 radio resource assignment unit
100 mobile station
110 radio communication unit
120 demodulation processing unit
130 radio control unit
131 radio resource assignment determination unit
132 SRS addition unit
140 modulation processing unit
ANT array antenna

The invention claimed is:

1. A radio communication system, comprising:
a base station having a plurality of antennas; and
a mobile station for performing a radio communication by connecting to the base station, wherein
the base station assigns a radio resource to the mobile station, transmits information of the assigned radio resource to the mobile station, and based on a sounding reference signal (SRS) from the mobile station, calculates a weight used for transmitting a radio signal to the mobile station, and
the mobile station receives the information, and when, in the information, an uplink radio resource in the same frequency band as a downlink radio resource assigned to the mobile station is not assigned to the mobile station, transmits to the base station the sounding reference signal by using a reference signal region of an uplink radio resource that is not assigned to the mobile station in the same frequency band as the downlink radio resource.

2. A mobile station for performing a radio communication by connecting to a base station, the mobile station comprising:
a plurality of antennas, configured to:
receive from the base station, information of an assigned radio resource; and
when, in the information, an uplink radio resource in the same frequency band as a downlink radio resource assigned to the mobile station is not assigned to the mobile station, transmit to the base station a sounding reference signal (SRS) by using a reference signal region of an uplink radio resource that is not assigned to the mobile station in the same frequency band as the downlink radio resource.

3. A radio communication method for a radio communication system including a base station having a plurality of antennas and a mobile station for performing a radio communication by connecting to the base station, the method comprising steps for:
the base station assigning a radio resource to the mobile station, information of the assigned radio resource to the mobile station;
the mobile station, receiving the information, and when, in the information, an uplink radio resource in the same frequency band as a downlink radio resource assigned to the mobile station is not assigned to the mobile station, transmitting, by using a reference signal region of an uplink radio resource that is not assigned to the mobile station in the same frequency band as the downlink radio resource, a sounding reference signal (SRS) to the base station; and
the base station, receiving the sounding reference signal from the mobile station, and based on the sounding reference signal, calculating a weight used for transmitting a radio signal to the mobile station.

4. The mobile station according to claim 2, wherein,
when an uplink radio resource in separate frequency band as the downlink radio resource assigned to the mobile station is assigned to the mobile station, transmits a reference signal by using the sounding reference signal (SRS) of an uplink radio resource close to the downlink radio resource.

* * * * *